United States Patent
Acker et al.

(10) Patent No.: US 6,460,733 B2
(45) Date of Patent: Oct. 8, 2002

(54) MULTIPLE-WALLED FUEL CONTAINER AND DELIVERY SYSTEM

(75) Inventors: William P. Acker, Rexford, NY (US); Gerhard Beckmann, Altamont, NY (US)

(73) Assignee: MTI MicroFuel Cells, Inc., Albany, NY (US)

(*) Notice: Subject to any disclaimer, the term of this patent is extended or adjusted under 35 U.S.C. 154(b) by 15 days.

(21) Appl. No.: 09/788,768

(22) Filed: Feb. 20, 2001

(51) Int. Cl.[7] .............................................. B61D 5/00
(52) U.S. Cl. .............................. 222/94; 222/1; 222/81; 222/129; 222/142.5
(58) Field of Search ........................... 222/81, 82, 83, 222/83.5, 87, 88, 94, 129, 142.5, 145.1, 1; 206/400, 524; 422/40

(56) References Cited

U.S. PATENT DOCUMENTS

| | | | | |
|---|---|---|---|---|
| 3,100,000 A | * | 8/1963 | Cook | 137/571 |
| 3,316,933 A | * | 5/1967 | Ajero | 137/576 |
| 3,325,056 A | * | 6/1967 | Lewis | 222/94 |
| 3,455,489 A | * | 7/1969 | Meshberg | 222/94 |
| 3,536,233 A | * | 10/1970 | Hulling et al. | 222/94 |
| 3,550,813 A | * | 12/1970 | Lehmann | 222/94 |
| 3,720,231 A | * | 3/1973 | Ajero | 137/576 |
| 3,799,398 A | * | 3/1974 | Morane et al. | 222/94 |
| 3,813,011 A | * | 5/1974 | Harrison et al. | 222/94 |
| 3,976,223 A | * | 8/1976 | Jass et al. | 222/94 |
| 4,402,351 A | * | 9/1983 | Momura et al. | 141/98 |
| 4,549,585 A | * | 10/1985 | Emerson | 141/95 |
| 4,673,624 A | | 6/1987 | Hockaday | 429/41 |
| 4,810,597 A | | 3/1989 | Kumagai et al. | 429/22 |
| 4,819,833 A | * | 4/1989 | Huddleston et al. | 222/155 |
| 5,406,995 A | * | 4/1995 | Gantzer | 141/325 |
| 5,523,177 A | | 6/1996 | Kosek et al. | 429/40 |
| 5,573,866 A | | 11/1996 | Van dine et al. | 429/13 |
| 5,599,638 A | | 2/1997 | Surampudi et al. | 429/33 |
| 5,631,099 A | | 5/1997 | Hockaday | 429/30 |
| 5,723,228 A | | 3/1998 | Okamoto | 429/12 |
| 5,759,712 A | | 6/1998 | Hockaday | 429/30 |
| 5,766,786 A | | 6/1998 | Fleck et al. | 429/17 |
| 5,773,162 A | | 6/1998 | Surampudi et al. | 429/39 |
| 5,795,668 A | | 8/1998 | Banerjee | 429/33 |
| 5,916,699 A | | 6/1999 | Thomas et al. | 429/3 |
| 5,945,231 A | | 8/1999 | Narayanan et al. | 429/30 |
| 5,992,008 A | | 11/1999 | Kindler | 29/730 |
| 6,068,941 A | | 5/2000 | Fuller et al. | 429/13 |
| 6,103,410 A | | 8/2000 | Fuller et al. | 429/13 |
| 6,176,395 B1 | * | 1/2001 | Abbott et al. | 222/94 |

OTHER PUBLICATIONS

"Fuel Cell", 1992 Fuel Cell Seminar, Program and Abstracts, pp. 233–236, 461–464.
"Miniaturized Fuel Cells for Portable Power", Helen L. Maynard and Jeremy P. Meyers, Lucent Technologies, 2000.
"Pocket–size PEMs", Paul Sharke, Mechanical Engineering.
"Polymer Electrolyte Fuel Cells as Potential Power Sources for Portable Electronic Devices", Shimshon Gottesfeld and Mahlon S. Wilson, pp. 487–517.

* cited by examiner

Primary Examiner—J. Casimer Jacyna
(74) Attorney, Agent, or Firm—Cesari and McKenna, LLP

(57) ABSTRACT

A fuel container and delivery assembly for use with a direct oxidation fuel cell system is provided. The container and delivery assembly allows clean fuel which, in a preferred embodiment, is in the form of either pure methanol or an aqueous methanol/water mixture to be delivered to the cell. Additives are mixed with the fuel containing substance prior to release of the fuel outside of the cell. The fuel substance is housed in an inner tank, which is disposed within an outer container. A plenum area defined by the space between the outer container and the flexible bladder is filled with the additives so that, upon rupture of the entire assembly, the fuel substance is mixed with the additives. In one embodiment of the invention, the inner tank is a flexible bladder. A rupture means is provided on a needle, which draws the fuel out in pure form, tears the flexible bladder so that any remaining fuel is mixed with the additives when it is desired to dispose of or re-fill the container.

37 Claims, 4 Drawing Sheets

US 6,460,733 B2

MULTIPLE-WALLED FUEL CONTAINER AND DELIVERY SYSTEM

BACKGROUND OF THE INVENTION

1. Field of the Invention

The present invention relates generally to the field of fuel cells and, more specifically, to a fuel container and delivery system for a liquid feed direct oxidation fuel cell.

2. Background Information

Fuel cells are devices in which an electrochemical reaction is used to generate electricity. A variety of materials may be suited for use as a fuel depending upon the materials chosen for the components of the cell. Organic materials, such as methanol or formaldehyde, are attractive choices for fuel due to the their high specific energy.

Fuel systems may be divided into "reformer-based"(i.e., those in which the fuel is processed in some fashion before it is introduced into the cell) or "direct oxidation" in is which the fuel is fed directly into the cell without internal processing. Most currently available fuel cells are of the reformer-based type, but field-processing requirements for such cells limits the applicability of those cells to relatively large systems.

Direct oxidation fuel cell systems may be better suited for a number of applications such as smaller mobile devices (i.e., mobile phones, handheld and laptop computers), as well as in larger applications. One example of a direct oxidation system is the direct methanol fuel cell system or DMFC. In a DMFC, the electrochemical reaction at the anode is a conversion of methanol and water to $CO_2$, $H^+$ and $e^-$. More specifically, a liquid hydrocarbon solution (typically aqueous methanol) is applied to a protonically-conductive (but, electrically non-conductive) membrane directly using a catalyst on the membrane surface to enable direct oxidation of the hydrocarbon on the anode. The hydrogen protons are separated from the electrons and the protons pass through the membrane electrolyte, which is impermeable to the electrons. The electrons thus seek a different path to reunite with the protons and travel through a load, providing electrical power.

The carbon dioxide, which is essentially a waste product, is separated from the remaining methanol fuel before such fuel is re-circulated. In an alternative usage of the carbon dioxide this gas can be used to passively pump liquid methanol into the feed fuel cell. This is disclosed in U.S. patent application Ser. No. 09/717,754, filed on Dec. 8, 2000, for a PASSIVELY PUMPED LIQUID FEED FUEL CELL SYSTEM, which is commonly owned by the assignee of the present invention, and which is incorporated by reference herein in its entirety.

The methanol fuel cell has been the subject of intensified recent development because of its high energy density in generating electric power from fuel. This has many benefits in terms of both operating costs and environmental concerns. Adaptation of such cells to mobile uses, however, is not straightforward because of technical difficulties associated with reforming the hydrocarbon fuel in a simple and cost effective manner. Further, a safe and efficient storage means for the hydrogen gas presents a challenge because hydrogen gas must be stored at high pressure and at cryogenic temperatures or in heavy absorption matrixes in order to achieve useful energy densities. It has been found, however, that a compact means for storing hydrogen is in a hydrogen rich compound with relatively weak chemical bonds, such as methanol (and to a lesser extent, ethanol, propane, butane and other hydrocarbons). Thus, the DMFC has been developed.

Depending upon the application with which the DMFC is ultimately employed, it may be desirable that the cell operate efficiently regardless of physical orientation. As such, the fuel delivery system that supplies the fuel to the cell should be capable of delivering the fuel in a variety of orientations, and independent of the volume of liquid in the system.

In addition, the components (including the management systems in the DMFC) are minute and subject to clogging if the fuel is in poor, impure or contaminated condition. Components on the anode side of the fuel cell need to remain uncontaminated for proper operation of the cell. Therefore, a very pure fuel must be fed to the anode in order to provide optimal DMFC performance.

While methanol has many attractive qualities as a fuel, it can be hazardous in certain proportions. In a pure state methanol is colorless and its vapor is virtually odorless. As such, there are numerous regulations and guidelines directing that certain additives be introduced to methanol that is used in commercial products (such as windshield washer fluid used in automobiles). These additives provide certain characteristics such as creating an unpleasant taste, adding smell to methanol vapors, as well as adding color to flame. It is possible, however, that some of these additives would react with an anode catalyst in a direct methanol fuel cell, or have a detrimental effect on the membrane. For example, some of the additives may adhere to the anode, blocking an active portion of the catalyst or otherwise impeding the performance of the anode, and therefore the DMFC.

It is thus an object of the present invention to provide a fuel storage container and delivery system for a direct oxidation fuel cell that introduces "clean" fuel in the form of either pure fuel or an aqueous fuel solution to the cell. It is a further object of the invention to provide a delivery system which allows for mixture of additives with the fuel prior to release of the fuel into the environment outside of the system. There remains a need, therefore, for a fuel storage container and delivery system that delivers pure fuel or an aqueous solution to the system while providing the capability of mixing the fuel with additives prior to its release elsewhere.

It is a further object of the invention to provide a delivery system that continues to supply fuel solution to the system, even while the system is in various orientations.

SUMMARY OF THE INVENTION

The present invention provides a delivery system in a protective multiple-walled fuel assembly for use with a direct oxidation fuel cell system. In one embodiment of the invention, the assembly includes an outer, firm-walled container. An inner tank is disposed entirely within the outer container. A plenum is defined between the outer container and the inner tank. The inner tank holds the fuel, which may be pure fuel or an aqueous fuel solution. The plenum is filled with one or more additive substances which, when mixed with the fuel, provide color, taste, and odor to enhance recognizability of the fuel.

The delivery system includes a needle such as a hypodermic needle having a hollow central portion. The needle is introduced through an opening in the outer container and pierces the inner tank to draw fuel out of the inner tank for delivery to the direct oxidation fuel cell. The needle withdraws the fuel either under the force of gravity or under pressure provided by a pressure chamber, which can also be disposed within the outer container. A pump may be used to provide suction to draw fuel from the delivery system.

The assembly thus delivers the fuel to the direct oxidation fuel cell system. However, should the cell or the container be dropped or subjected to force that ruptures the assembly, both the inner tank containing the fuel and the outer container (including the additives) are ruptured. As a further precaution, a coupling agent, which may be a wire or string, can be employed between the inner tank and the outer container to cause rupture or induce rupture of the inner tank in the case that the outer tank ruptures first. Accordingly, this causes mixing of the fuel with the additives, thus providing the safety features of a liquid fuel mixed with additives.

In accordance with another aspect of the invention, the inner tank is a flexible bladder that is filled with fuel. Again, there is a plenum between the outer container and the flexible bladder which plenum contains the additives. There is also a pressure chamber disposed within the container, which applies pressure to the bladder. The outer container is sealed, and a needle is introduced through the seal to draw out the fuel. The bladder deflates under the applied pressure as the fuel is consumed by the fuel cell. This embodiment exhibits enhanced performance because the shape of the flexible bladder conforms generally to the volume of the liquid it contains. Accordingly, the liquid fuel is accessible to the fuel cell independent of the volume of liquid in the bladder or of the orientation of the assembly.

In accordance with yet a further aspect of the invention, a safety device is provided on the needle that is introduced into the flexible bladder that serves as the inner tank in this embodiment. When the needle is withdrawn from the flexible bladder, the safety device causes a tear in the bladder that causes the fuel to mix with the additives in the plenum. Accordingly, a safer liquid is provided that can later be more easily disposed of before refilling of the fuel delivery assembly, or disposed of directly in a single usage embodiment.

BRIEF DESCRIPTION OF THE DRAWINGS

The invention description below refers to the accompanying drawings, of which.

DETAILED DESCRIPTION OF AN ILLUSTRATIVE EMBODIMENT

The present invention is a fuel storage container and delivery assembly. The fuel may be any hydrocarbon-based fuel including, but not limited to, methanol, ethanol, propane and butane, or an aqueous solution thereof. For purposes of illustration, we herein describe an illustrative embodiment of the invention as it is employed in connection with a direct methanol fuel cell ("DMFC"), with the fuel substance being methanol or an aqueous methanol solution. It should be understood, however, that it is within the scope of the present invention that the fuel container and delivery system can be readily used for other fuels to be stored and delivered to direct oxidation fuel cells. Thus, as used herein, the word "fuel" shall include methanol, ethanol, propane, butane or combinations thereof, and aqueous solutions thereof and other hydrocarbon fuels amenable to use in a direct oxidation fuel cell system.

Figure 1:
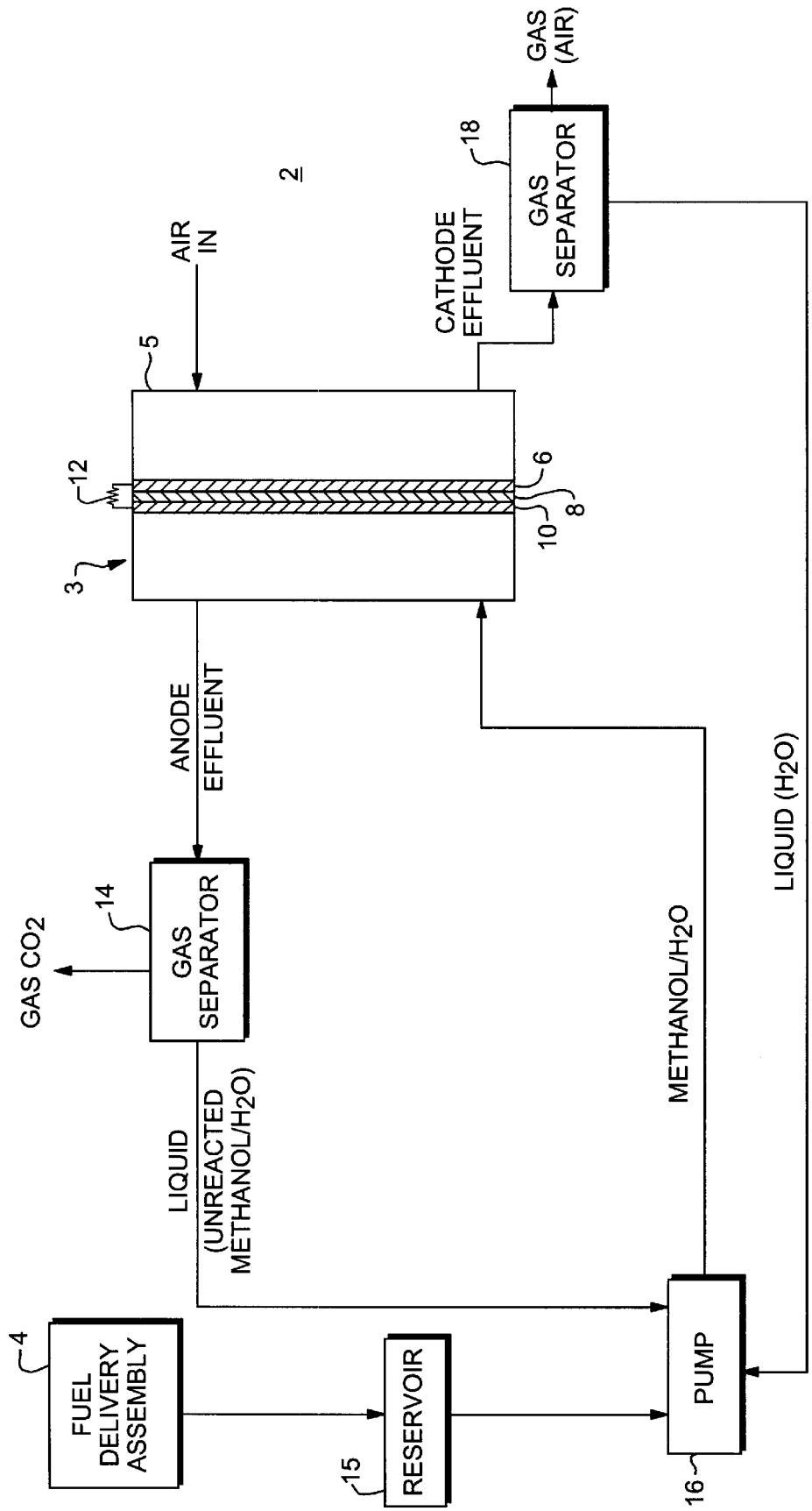
FIG. 1 is a block diagram of a direct methanol fuel cell system with which the present invention may be employed.

FIG. 1 shows a direct methanol fuel system 2 with which the fuel delivery system of the present invention may be used. For a better understanding of the present invention, the system 2 will be briefly described. The system 2 contains a direct methanol fuel cell (DMFC) 3 and a fuel delivery system 4 in accordance with the present invention. The direct methanol fuel cell 3 includes a housing 5 which encloses a cathode 6, a membrane electrolyte 8 and an anode 10.

Methanol or a solution of methanol and water are introduced into the anode side of housing 5 while oxygen (air) is introduced into the cathode side of the housing 5. The source of the oxygen is preferably ambient air but it should be understood that other. sources could be used. As a result of the reactions at the anode and cathode, free electrons flow from the anode 10 through a load 12 to the cathode 6, while hydrogen ions flow from the anode 10 through the membrane electrolyte 8 to the cathode 6. So long as the chemical reactions continue, a current is maintained through the load 12.

Fuel from the fuel delivery system 4 may be used to fill a reservoir 15, from which the fuel will be drawn. Alternatively, fuel may be supplied directly to pump 16, in which case the reservoir 15 is not needed. The pump 16 is coupled to a first gas separator 14, and to the direct methanol fuel cell 3, as well as to gas separator 18. The first gas separator 14 receives effluent from the anode 10 of the fuel cell 3 and separates it into liquid (i. e., unreacted methanol or methanol and water) and carbon dioxide. The liquid component is supplied to the pump 16 for recirculation to the fuel cell 3. The pump 16 creates suction to draw fuel from the fuel delivery system 4. The gas component may also be supplied to pump 16 and may be used to drive the pump in accordance with the teachings of commonly-owned U.S. patent application Ser. No. 09/717,754.

Figure 2:
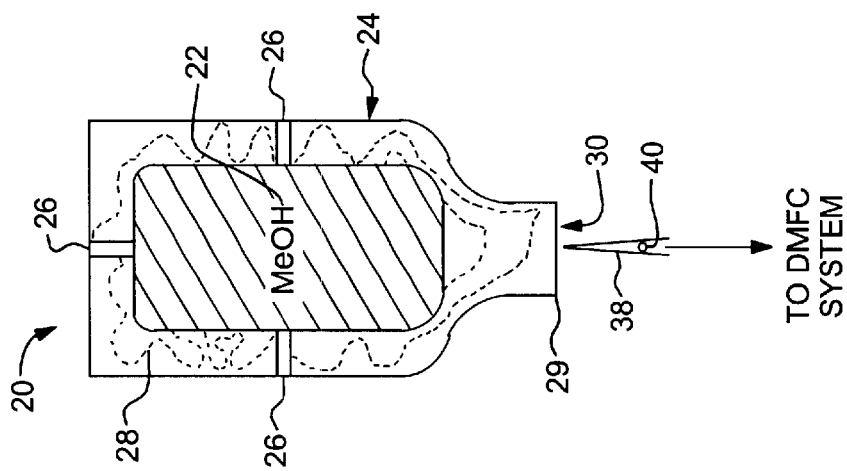
FIG. 2 is a schematic cross section of one embodiment of the fuel delivery system of the present invention.

As noted, it is desirable to introduce only "clean" fuel (in the form of either pure methanol or a methanol/water mixture) into the system 2. Referring to FIG. 2, a fuel delivery assembly 20, which represents one implementation of assembly 4 (FIG. 1) is constructed in accordance with a first embodiment of the present invention. The fuel container and delivery assembly 20 is comprised of a multiple walled-container. More specifically, an inner tank 22 is disposed within an outer container 24. The inner tank 22 contains the pure methanol or an aqueous methanol solution. The inner tank 22 may be constructed from a rigid material, or a semi-rigid material. The outer container 24 is preferably composed of either middle or a high-density, chemically inert plastic. In the embodiment of the invention that is illustrated in FIG. 2, both the inner tank 22 and the outer container 24 are composed of semi-rigid or rigid materials. Materials that may be used include thermoplastic materials, thermoset resins or plastics as well as other workable materials, which may be suitable. The inner tank 22 is mechanically attached to the outer container 24 by brackets 26 or other suitable attachment means.

A plenum 28, which is defined between the outer container 24 and the inner tank 22, is filled with a mixture containing the desired additives including, but not limited to coloring and flavoring compounds. The additives may be in a paste or liquid form or may consist of microencapsulated solids. The encapsulation material is. dissolved by the introduction of methanol upon mixing, thus releasing the additives. Alternatively, microencapsulated foam can be included as the additive mixture, which foam is released when mixed with methanol.

The inner tank 22 is filled with a solution of methanol or aqueous methanol solution and is sealed. This inner tank 22 is then placed on a first half of the outer container 24. The second half (not shown) of the outer container is placed over the inner tank 22, leaving an opening at one end thereof 29 (FIG. 2). The plenum 28 between the inner tank 22 and the outer container 24 is then filled with desired additives. The outer container 24 is then sealed with a permanent plastic seal 30 or with a plug 32.

Figure 3A:
FIG. 3A is a schematic side view of the sealing plug that is used in one embodiment of the present invention.
Figure 3B:
FIG. 3B is a schematic top plan view of the sealing plug of FIG. 3A.

The plug 32 is illustrated in FIG. 3A. A top plan view of the plug 32 is illustrated in FIG. 3B. The plug 32 preferably includes a center portion 34, which is rubber or flexible plastic material. The methanol fuel is removed from the inner tank 22 by inserting a needle 38, which is similar to a hypodermic needle, through the seal 30 or the rubber portion 34 of the plug 32 to penetrate the inner tank 22. The methanol solution is then, by force of gravity, drawn from the inner tank 22 through an aperture 40 in the needle 38 into the reservoir 15 or directly into the direct methanol fuel cell system illustrated in FIG. 1.

In this fashion, the DMFC 3 is fueled without introducing unnecessary additives into the fuel supply, thus avoiding contamination of the anode or clogging of conduits by the additives.

Figure 4:
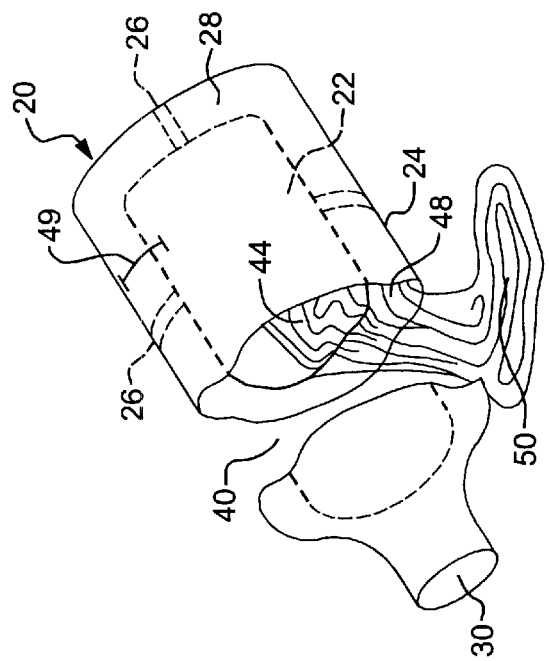
FIG. 4 is an isometric illustration of the fuel container and delivery assembly of one embodiment of the present invention showing a rupture of the assembly.

The additives, however, will be mixed with the fuel should there be a rupture of the assembly 20. As illustrated in FIG. 4, if a product. such as a hand held device (e.g., a mobile telephone or a laptop computer), should be dropped or crushed, the fuel container and delivery assembly 20 breaks, as in the break 40, causing the fuel 44 to escape from inner tank 22. However, in accordance with the invention, as the methanol is released from inner tank 22, it is mixed with additives 48, which are released from the plenum 28. As a further precaution, to guard against the possibility of the outer container rupturing prior to the inner tank, we have provided a coupling device 49 which ruptures the inner tank 22 upon rupture of the outer container 24. In accordance with one aspect of the invention, the rupture device 49 is a wire or string that provides tension on the inner tank 22 to rupture it when the outer container 24 ruptures.

Figure 5:
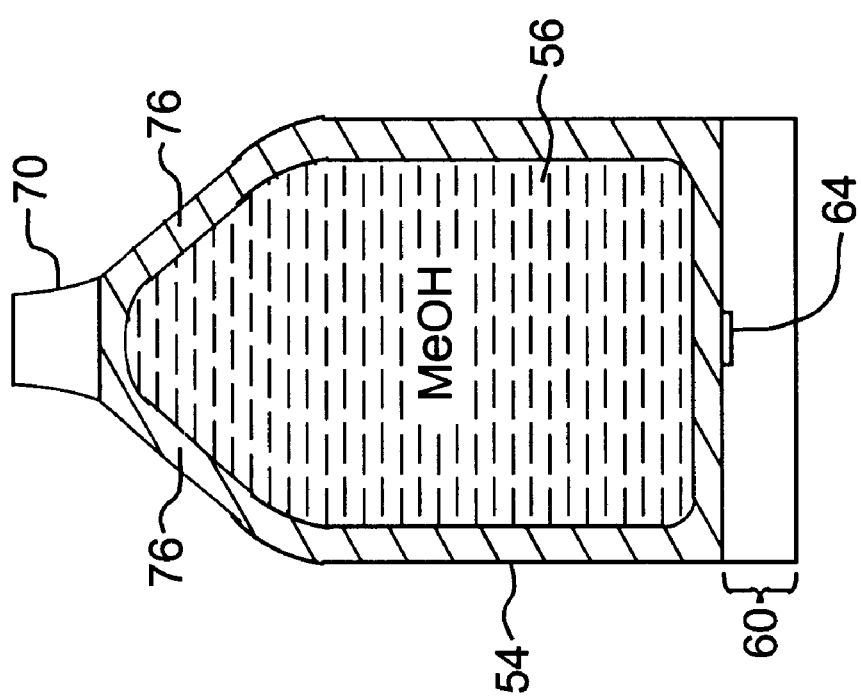
FIG. 5 is a schematic cross section of the fuel container and delivery assembly of the present invention illustrating the pressure chamber aspect of the assembly.

FIG. 5 illustrates another embodiment of the invention. An outer container 54 is a housing preferably fabricated from a plastic or metal. An inner tank 56 is a flexible bladder, which is fully expanded by filling it with a fuel. It may be composed of a plastic resin that is capable of being pierced by a needle. The inner tank 56 may also be a semi-rigid, preferably collapsible container, if desired, but it is referred to for purposes of this description as a flexible, bladder. Within the outer container 54, a separate chamber 60 is filled with gas at a higher pressure than the remainder of the area within the outer container 54. The chamber 60 is integrated into or mechanically attached to the outer container 24. Alternatively, a small area of the enclosure within the outer container 54 is physically segregated from the remainder, and a higher pressure is created within this small area. The gas in the chamber 60 is released very slowly by way of a flow-limiting orifice 64. The higher pressure within the chamber thus compresses the flexible bladder 56 to force the fuel into the DMFC as needed.

Figure 6:
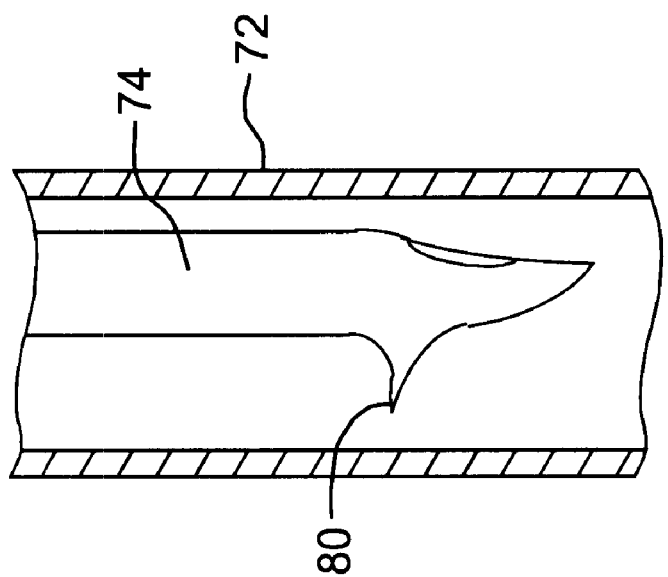
FIG. 6 is a schematic cross section of a needle containing a safety device to be used in a container and delivery assembly in accordance with the present invention.

The outer container 54 is sealed with a seal or plug 70. As illustrated in FIG. 6, a guide 72 houses a needle 74. The guide 72 provides sufficient tension to allow the needle 74 to puncture the seal 70 as well as the flexible bladder 56 in order to draw fuel from to bladder 56 into the DMFC. The guide 72 and needle 74 may be suitably connected to either the DMFC or the assembly including outer container 54, as desired in the particular application. A valve in the container or which may be within the DMFC (not shown) may be desirable for controlling the flow of fuel as will be understood by those skilled in the art. It may be further desirable to shape the external tank as shown in FIG. 5 with sloped sides 76 in a way that funnels the fuel into the DMFC.

Figure 7B:
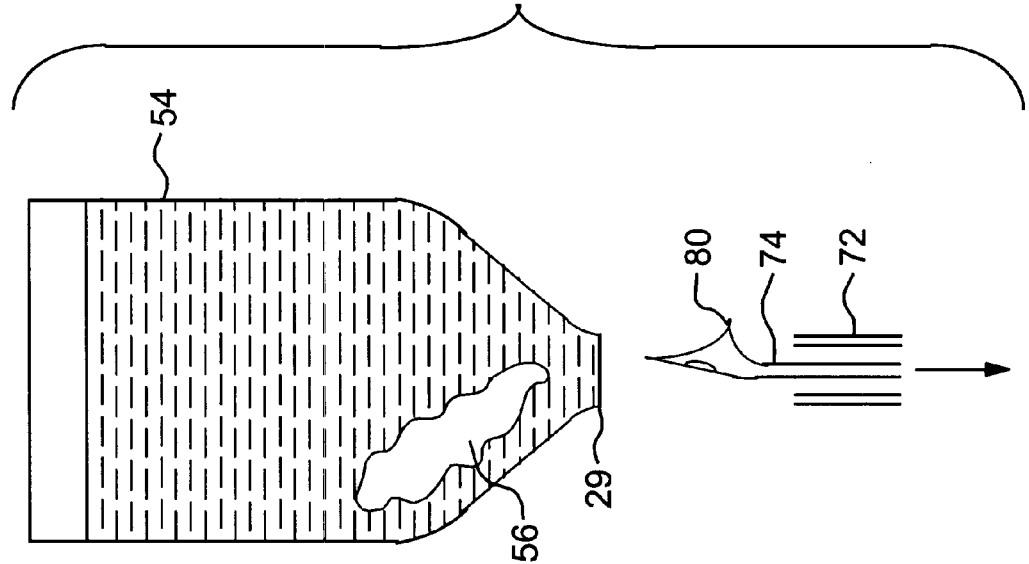
FIG. 7B is a schematic cross section of the flexible bladder as ruptured in accordance with the present invention.
Figure 7A:
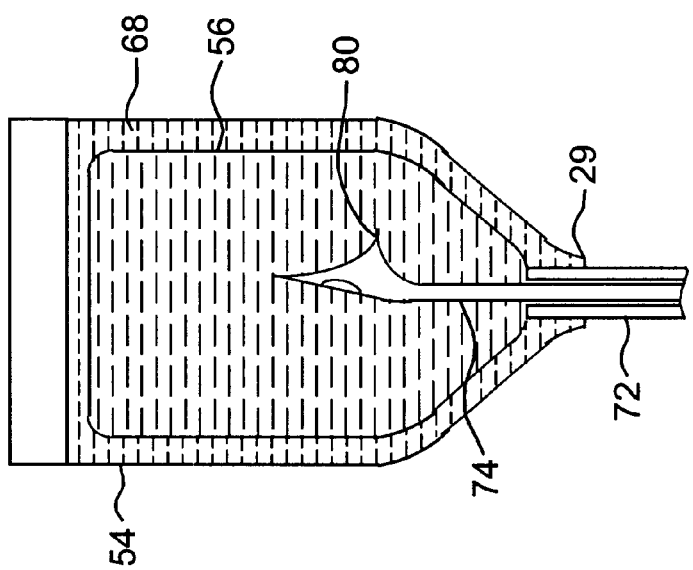
FIG. 7A is a schematic cross section of the needle with the safety device as introduced into the flexible bladder of one embodiment of the present invention.

As illustrated in FIGS. 7A and 7B, in which like components have the same reference characters as in the earlier described figures, the guide 72 houses needle 74. The fuel container and delivery assembly includes flexible bladder 56, which contains fuel. The plenum 68, which is defined between the outer container 54 and the flexible bladder 56, is filled with additives. The needle 74 is introduced into the opening 29 of the outer container 54 and pierces the inner flexible bladder 56. In operation, the fuel is then drawn out of the assembly and fed as the fuel supply to the associated DMFC.

It is highly desirable to provide that any unused methanol remaining in the assembly be mixed with the additives prior to its disposal or release from the fuel delivery assembly. As such, we have provided in this embodiment of the invention a safety device 80 on the needle 74. As illustrated in FIG. 7B, when the needle and housing are removed from the fuel delivery assembly, in the direction of the arrow, this causes a tear in the flexible bladder 56. The methanol solution is then released from the bladder 56. As it is released from the bladder 56, it mixes with the additives contained in the plenum 68. An external seal or plug 88 is used to ensure that the methanol solution and additive mixture does not escape from the external tank 54 into the environment. The plug 88 is preferably constructed of a dense self-sealing material that substantially resists the additives and methanol solution from being released.

After the fuel supply is exhausted, the tank (now containing the mixture) can thereafter be emptied and a new flexible bladder can be introduced into the tank filled with methanol. Then, the plenum is refilled with additives and the tank is resealed. Alternatively, it may be desirable to provide a disposable assembly in a single usage embodiment in which case the liquid disposed of includes the additives.

As stated, it should also be understood that the present invention can also be readily employed with fuels other than methanol or methanol/water mixtures. Also, as noted, the additives may be placed within the inner tank, and the fuel disposed within the outer container if preferred in a particular application.

The foregoing description has been directed to specific embodiments of the invention. It will be apparent, however, that other variations and modifications may be made to the described embodiments, with the attainment of some or all of the advantages of such. Therefore, it is the object of the appended claims to cover all such variations and modifications as come within the true spirit and scope of the invention.

What is claimed is:

1. A multiple-walled fuel container and delivery assembly for use with an associated direct oxidation fuel cell system, the assembly comprising:

an inner tank filled with a carbonaceous fuel, being capable of being pierced or intentionally accessed for delivering fuel to said associated direct oxidation fuel cell system, and said inner tank being substantially comprised of a material that is capable of rupture;

an outer container having an opening at one end thereof, said outer container enclosing said inner tank and defining a plenum between an interior wall of said outer container and said inner tank, said plenum being filled with a mixture of one or more additives, wherein, upon rupture of said inner tank, or rupture of said assembly, said fuel is mixed with said additives.

2. The fuel container and delivery assembly as defined in claim 1, further comprising:

a conduit for extracting said fuel in a pure form, without said one or more additives, from said inner tank.

3. The fuel delivery assembly as defined in claim 2 wherein said conduit comprises a needle having an aperture therein through which said fuel passes.

4. The fuel container and delivery assembly as defined in claim 3 wherein:

said outer container includes a seal at one in thereof which seal is composed of a plastic resin capable of being pierced by said needle.

5. The fuel container and delivery assembly as defined in claim 3, further comprising:

a plug sized to fit within said opening in said outer container to seal said outer container, said plug also including a rubber portion disposed thereon capable of being pierced by said needle for introduction of said needle into said outer container.

6. The fuel container and delivery assembly as defined in claim 5 wherein said conduit includes:

a guide sized to fit over said opening in said outer container; and a needle sized to fit within said guide and said needle having an aperture therein through which said fuel can pass upon piercing said seal at said opening of said outer container.

7. The fuel container and delivery assembly as defined in claim 6 wherein:

said fuel is disposed within said flexible bladder and said additive component is disposed within the plenum between the interior wall of said outer container and the flexible bladder; and a pressure chamber being disposed within the interior of said outer container, said pressure chamber applying pressure to said flexible bladder to compress said flexible bladder whereby the fuel is driven into an aperture in said needle to extract said fuel.

8. The fuel container and delivery assembly as defined in claim 7 further comprising:

coupling device disposed between said inner tank and said outer container in such a manner that said coupling device causes a rupture in said inner tank upon rupture of said outer container whereby said fuel is mixed with said additives when said outer container is ruptured.

9. The fuel container and delivery assembly as defined in claim 7 further comprising:

a conduit for extracting said fuel in pure form without said additives from said inner tank.

10. The fuel container and delivery assembly as defined in claim 9 wherein said conduit comprises a needle having an aperture therein, through which said methanol-containing substance passes.

11. The fuel container and delivery assembly as defined in claim 10 wherein said conduit includes:

a guide sized to fit over said opening in said outer container; and a needle sized to fit within said guide and said needle having an aperture therein through which said methanol containing substance passes upon piercing said seal and said opening of said outer container.

12. The fuel container and delivery assembly as defined in claim 7 wherein said inner tank is a flexible bladder that is substantially fully expanded upon being filled with said methanol containing substance.

13. The fuel container and delivery assembly as defined in claim 12 further comprising:

a pressure chamber disposed within an interior of said outer container to apply pressure to said flexible bladder to compress the flexible bladder whereby said methanol-containing substance is driven into said conduit.

14. The fuel container and delivery assembly as defined in claim 13 further comprising:

deflating device associated with said needle and connected to said needle in such a manner that said deflating device causes a tear in said bladder in such a manner that said methanol containing substance is mixed with said additives upon rupture of said flexible bladder.

15. The fuel container and delivery assembly as defined in claim 1 wherein said inner tank is a flexible bladder, which is substantially fully expanded upon being filled with said fuel.

16. The fuel container and delivery assembly as defined in claim 15 further comprising:

a pressure chamber disposed within an interior of said outer container to apply pressure to said flexible bladder to compress the flexible bladder whereby said fuel is driven into said conduit.

17. The fuel container and delivery assembly as defined in claim 15 further comprising:

deflating device associated with said needle and connected to said needle in such a manner that said deflating device causes a tear in said bladder such that said fuel is mixed with said additives upon rupture of said flexible bladder.

18. A fuel container and delivery assembly for uses with an associated direct oxidation fuel cell system the assembly comprising:

means for holding a carbonaceous fuel including an inner tank filled with said fuel, and said inner tank being capable of being pierced or intentionally accessed for delivering fuel to said associated direct oxidation fuel cell system, and said inner tank being substantially comprised of a material that is capable of rupture; and means for enclosing said inner tank including an outer container which defines a plenum between an interior wall of said outer container and said inner tank, said plenum being filled with a mixture of one or more additives and for mixing said additives with said fuel substance upon rupture of said inner tank or said assembly.

19. The fuel container and delivery assembly as defined in claim 18 further comprising:

means for extracting said field in a pure form without said one or more additives from said inner tank.

20. The fuel container and delivery assembly as defined in claim 19 further comprising:
said means for extracting said fuel being a needle having an aperture therein through which said fuel passes.

21. The fuel delivery assembly as defined in claim 20 wherein:
said means for holding said hydrocarbon fuel is a flexible bladder that is substantially fully expanded upon being filled with said fuel.

22. The fuel delivery assembly as defined in claim 21 further comprising:
means for applying pressure to said flexible bladder to compress said flexible bladder whereby said fuel is driven into said means for extracting.

23. The fuel container and delivery assembly as defined in claim 22 further comprising:
means for deflating said flexible bladder in such a manner that said flexible bladder is deflated and said fuel is mixed with said additives when said flexible bladder is deflated.

24. The fuel container and delivery assembly as defined in claim 23 wherein:
said outer container includes sealing means.

25. A fuel container and delivery assembly as defined in claim 23 further comprising:
means for applying pressure to said flexible bladder to compress said flexible bladder whereby fuel is driven into an aperture in said needle to extract said fuel.

26. The fuel container and delivery assembly as defined in claim 25 further comprising:
means for deflating said flexible bladder upon removal of said needle whereby said fuel is mixed with said additives once said needle means is removed from said assembly.

27. The fuel container and delivery assembly as defined in claim 18 further comprising:
plug means sized to fit within said opening in said outer container for sealing said outer container, said plug means also having means capable of being pierced by said needle for introducing said needle into said outer container.

28. The fuel container and delivery assembly as defined in claim 27 wherein:
said extracting means includes
guide means sized to fit over said opening in said outer container; and
needle means sized to fit within said guide means and said needle means having an aperture therein through which said fuel can pass upon piercing said seal at said opening of said outer container.

29. A method of storing and delivering fuel substances to a direct oxidation fuel cell system, including the steps of:
filling an inner tank that is capable of being pierced or intentionally accessed and that is capable of rupture with a fuel substance;
disposing said inner tank within an outer container allowing a plenum area between an inner wall of said outer container and said inner tank;
filling said plenum with one or more additives; and
sealing said inner tank and said outer container in such a manner that upon rupture of said inner tank and said outer container, said fuel substance is mixed with said one or more additives.

30. The method as defined in claim 29, including the further step of:
delivering said fuel substance, without said additives, to said direct oxidation fuel cell via a conduit provided at one end of said outer container, but which conduit is introduced into said inner tank, such that fuel, without said additives is delivered to said cell.

31. The method as defined in claim 30, including the further step of:
providing as said conduit a needle having an aperture therein through which said fuel substance can pass to said cell.

32. The method as defined in claim 31, including the further step of:
providing said inner tank as a flexible bladder; and
applying pressure to said flexible bladder to deliver fuel from said flexible bladder to said conduit.

33. The method as defined in claim 32, including the further step of:
deflating said flexible bladder when removing said needle from said inner tank such that said fuel substance is mixed with said additives when said needle is removed from said inner tank.

34. A fuel container and delivery assembly for use with an associated direct oxidation fuel cell, the assembly comprising:
an outer container having an interior portion defined by an interior wall, and an opening at one end thereof;
an inner flexible bladder disposed within said outer container and sized to define a plenum between said flexible bladder and said interior wall of said outer container;
a fuel disposed in one of either said inner flexible bladder or said outer container;
an additive substance disposed in the other of said flexible bladder and said outer container, whereby, upon rupture of the assembly, said fuel substance and said additives are mixed together; and
a conduit for extracting substances from said assembly for delivery to said direct oxidation fuel cell.

35. A fuel container and delivery assembly as defined in claim 34 wherein:
said conduit comprising a needle having an aperture therein through which said fuel passes.

36. The fuel container and delivery assembly as defined in claim 35 further comprising:
deflating device associated with said needle and connected to said needle in such a manner that said deflating device cause a tear in said bladder such that said fuel and said additives are mixed upon tearing said flexible bladder.

37. The fuel container and delivery assembly as defined in claim 36 further comprising:
coupling device disposed between said inner tank and said outer container in such a manner that said coupling device causes a rupture of said inner tank upon rupture of said outer container whereby said fuel is mixed with said additives when said outer container is ruptured. said outer container whereby said fuel is mixed with said additives when said outer container is ruptured.

* * * * *